United States Patent [19]

Gelblum

[11] Patent Number: 4,490,347

[45] Date of Patent: Dec. 25, 1984

[54] PROCESS FOR SULFURIC ACID REGENERATION

[75] Inventor: Peter G. Gelblum, Philadelphia, Pa.

[73] Assignee: E. I. Du Pont de Nemours and Company, Wilmington, Del.

[21] Appl. No.: 464,429

[22] Filed: Feb. 7, 1983

[51] Int. Cl.³ .................. C01B 17/98; C01B 17/50; C01B 17/90; C01B 17/74

[52] U.S. Cl. .................................. 423/521; 423/522; 423/525; 423/531; 423/540

[58] Field of Search ........... 423/522, 533, 532, 541 A, 423/540, 541, 539

[56] References Cited

U.S. PATENT DOCUMENTS

| | | | |
|---|---|---|---|
| 1,344,905 | 6/1920 | Laist et al. | 423/542 |
| 1,447,645 | 3/1923 | Chase et al. | 423/542 |
| 1,520,093 | 12/1924 | Shapleigh | 423/523 |
| 1,995,360 | 3/1935 | Merrian | 423/533 |
| 2,128,108 | 8/1938 | Tyrer et al. | 423/522 |
| 2,394,426 | 2/1946 | Carter | 423/522 |
| 2,406,930 | 9/1946 | Titlestad | 423/522 |
| 3,359,069 | 12/1967 | Furkert et al. | 423/540 |
| 3,419,601 | 12/1968 | Isbell, Jr. | 423/541 A |
| 3,645,683 | 2/1972 | Isbell, Jr. | 23/177 |
| 3,825,657 | 7/1974 | Jenniges | 423/522 |
| 3,907,979 | 9/1975 | Jenniges | 423/522 |
| 4,212,855 | 7/1980 | Kerner | 423/542 |
| 4,256,721 | 3/1981 | Blakey et al. | 423/540 |

FOREIGN PATENT DOCUMENTS

| | | | |
|---|---|---|---|
| 2506438 | 8/1976 | Fed. Rep. of Germany | 423/540 |
| 1603093 | 11/1981 | United Kingdom | 17/765 |
| 1602621 | 11/1981 | United Kingdom | 423/540 |

OTHER PUBLICATIONS

Olsen, John C., Unit Processes and Principles of Chemical Engineering, D. Van Nostrand Co., Inc. N.Y., N.Y., 1932, pp. 1-3.

Primary Examiner—Gary P. Straub

[57] ABSTRACT

Process for regenerating spent acid is improved by using oxygen-enriched air for combustion, recycling stack gases, and preheating spent acid and air fed to the furnace.

2 Claims, 4 Drawing Figures

PROCESS FOR SULFURIC ACID REGENERATION

FIELD OF THE INVENTION

This invention relates to improvements in the process for regenerating spent sulfuric acid after oleum has been used in reaction processes.

BACKGROUND OF THE INVENTION

Sulfuric acid containing sulfur trioxide is useful in a number of commercial reactions. For example, it is used in alkylation of hydrocarbons, in nitration processes for dehydration, and in the preparation of methyl methacrylate. All of these processes employ sulfuric acid containing sulfur trioxide (called oleum hereinafter) and in all of these processes the oleum becomes depleted or "spent" and needs to be regenerated. Thus in the preparation of methyl methacrylate, oleum, acetone cyanohydrin (ACN) and methanol are reacted in a two-step procedure to form a mixture of methyl methacrylate, ammonium bisulfate and excess dilute sulfuric acid. The methyl methacrylate is removed, and the mixture of ammonium bisulfate and excess dilute sulfuric acid (the mixture is called spent acid) is regenerated to produce more oleum. The spent acid is pyrolyzed to form a mixture of gaseous oxides, including sulfur dioxide; the sulfur dioxide is then oxidized to sulfur trioxide which is absorbed in concentrated sulfuric acid to form oleum. The oleum thus regenerated is recycled for use in the alkylation, nitration or methacrylate preparations referred to previously.

This application pertains to improvements in the regeneration of oleum in the above processes, as opposed to the use of oleum in the primary alkylation, nitration, or methacrylate preparations referred to above. In this regeneration of oleum, considerable amounts of fuel and oxygen, added in the form of air, are fed to a furnace in which the ammonium bisulfate and dilute sulfuric acid are pyrolyzed. Inert gases (predominantly nitrogen) in the air entering the furnace are detrimental in that: (1) they add to the heat load because they must be heated to the pyrolysis temperature along with the oxygen present; (2) nitrogen forms nitrogen oxides in the hot oxidizing environment of the furnace, thereby creating nitrogen oxide pollutants that must ultimately be discharged as part of the stack gas and generating niter, a product contaminant which reduces the yield of the resulting oleum product; (3) they dilute the concentration of $SO_2$ in the converter (where $SO_2$ is converted to $SO_3$), thereby limiting conversion of $SO_2$ to the desired $SO_3$ and increasing $SO_2$ discharge rate to the atmosphere as a pollutant in the stack gas; (4) they limit the strength of the oleum which can directly be produced; (5) they reduce the holdup time of the reactants in the converter, for a given throughput rate, making it necessary to use larger volumes of catalyst for the desired reaction; and (6) they cause a pressure drop in the equipment used in the regeneration process.

One object of the process improvements of this invention is to increase the capacity of a spent acid regeneration facility by reducing the mass and volumetric flow in the system and increasing the concentration of $SO_2$ in the mass which, in turn, increases the oleum yield and concentration.

Another object is to save energy by reducing the amount of inert gases in the furnace thus reducing the amount of fuel needed to heat the mass to pyrolysis temperature and by reducing the power needed to push the mass through the entire system.

Yet another object is to reduce the pollution load by reducing the volume of stack gas, i.e., gas exhausted to the atmosphere after completion of the process, and the emission rate of pollutants, $SO_2$, and $NO_x$ per unit of 100% acid produced.

A further object is to increase the concentration of the oleum produced without having to resort to conventional dewatering and to improve the quality of the product by minimizing the amount of niter produced.

SUMMARY OF THE INVENTION

A first aspect to achieving the above objects is to feed oxygen-enriched air, i.e., air that is enriched with oxygen, into the furnace. Since the ratio of oxygen to inerts in oxygen-enriched air is higher, less inerts are introduced into the process per mole of oxygen consumed. Thus less fuel is needed to heat gases in the furnace. The degree of enrichment of the air with oxygen has practical limitations. As the concentration of oxygen is increased, the burner temperature increases, flame profiles change, and more sophisticated burners and controls are needed to attain efficient combustion, long equipment life, and to minimize the potential for explosion. Oxygen-Enriched air containing 22 to 40% oxygen by volume can be used in conventional sulfuric acid regeneration (SAR) furnaces with a reasonable amount of control instrumentation.

A second aspect for improvement is in mixing portions, e.g. 30–90%, of the stack gas with air containing $O_2$ at a concentration greater than its normal concentration in air and entering the mixture into the furnace. Preferably, the mixture will contain 22 to 40 volume percent oxygen-enriched air and 60 to 78 volume percent stack gas. This results in a substantial reduction in the amount of nitrogen introduced into the system. In this case, the reduction of pollutants released to the atmosphere is particularly large because the system approaches an essentially closed loop operation. There are other benefits as well. This improvement reduces the amount of moisture entering the system by eliminating that moisture which ordinarily enters with air; this, in turn, lowers the amount of water which must be purged from the system in the form of dilute $H_2SO_4$. It also makes possible the recovery of most of the sensible heat and sulfur values lost otherwise in the stack gas that consists primarily of inert gases.

Further improvement is obtained by maximizing the indirect preheating of the spent acid and the oxygen-enriched air being fed to the furnace. This reduces the amount of combustion products and inert gases introduced into the process by the direct combustion of fuel.

DETAILED DESCRIPTION OF THE INVENTION

The Art Process Improved Upon

Figure 1:
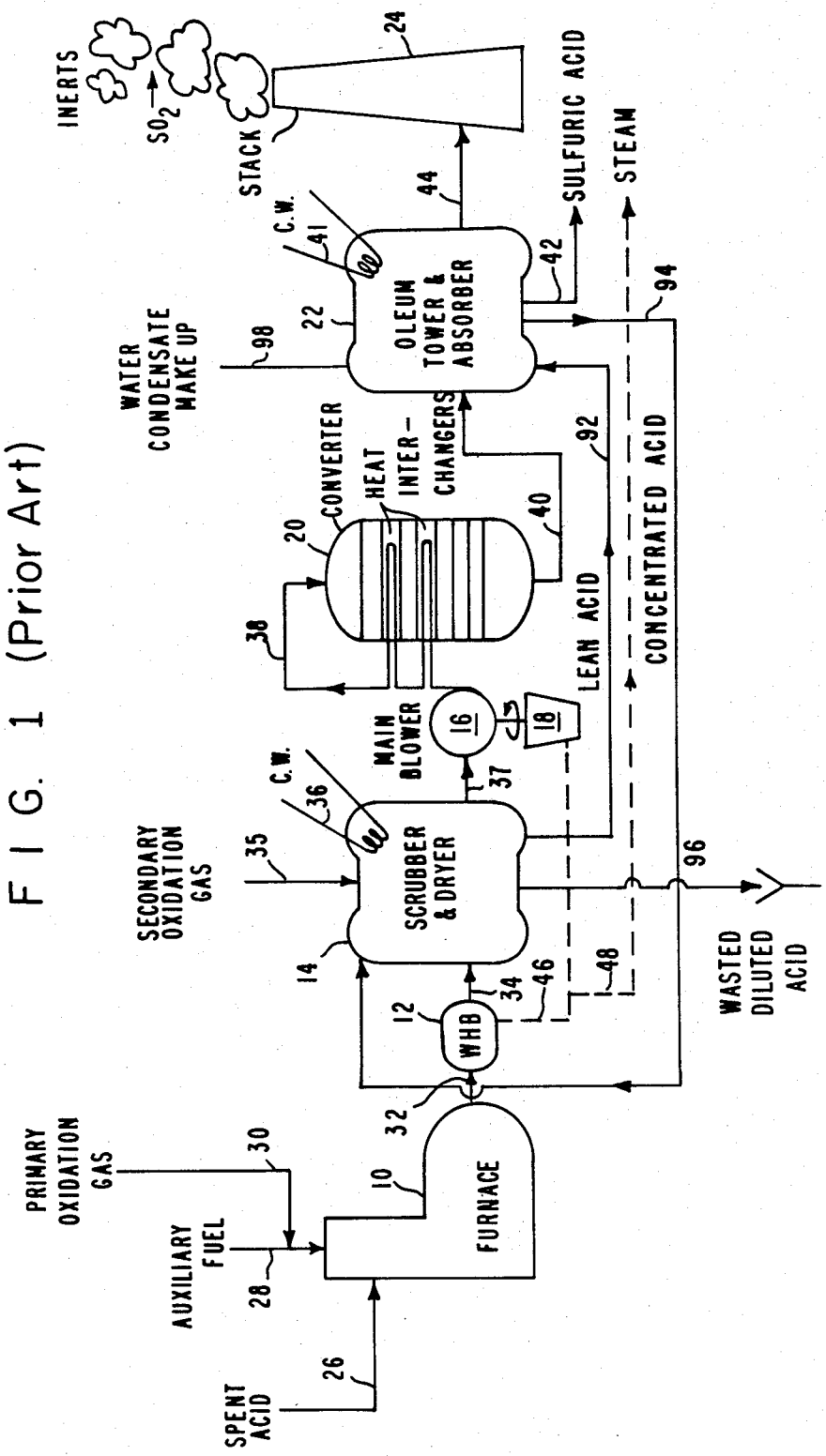
FIG. 1 is a diagramatic flow sheet of a prior art spent acid regeneration (SAR) system.

As shown in FIG. 1, the main elements of a known art sulfuric acid regeneration process comprise a furnace 10, a waste heat boiler 12, a scrubber and dryer 14, a main blower 16 driven by turbine 18, a converter 20 followed by an oleum tower and absorber 22 and stack 24.

Spent acid is fed into furnace 10 through pipe 26 while auxiliary fuel such as natural gas is injected through pipe 28 and air (sometimes referred to hereinafter as primary oxidation gas) is supplied through pipe 30. The spent acid is usually sprayed in through a number of nozzles surrounding the flame created by the burning fuel. Combustion takes place in furnace 10 and the furnace gases, which consist primarily of $CO_2$, $H_2O$, $SO_2$, $SO_3$, oxides of nitrogen ($NO_x$), $O_2$ and $N_2$, at elevated temperature, exit through pipe 32 to waste heat boiler 12, where the furnace gases are cooled. The furnace gases then pass through pipe 34 to scrubber-dryer 14 which has secondary air (sometimes referred to hereinafter as secondary oxidation gas) supplied through pipe 35. In the scrubber-dryer, particulate matter and water are removed. Cooling water (C.W.) circulates through pipe 36. The dry gas product exits the scrubber-dryer through pipe 37. The gas is driven by main blower 16, and forced by way of pipe 38 through heat interchangers into converter 20. In converter 20, the $SO_2$ in the gas is oxidized to $SO_3$ in the presence of a catalyst. $SO_3$ from converter 20 is conveyed through pipe 40 and more heat exchangers (not shown) to oleum tower and absorber 22. Cooling water (C.W.) is supplied through pipe 41. In the tower and absorber, $SO_3$ is removed by absorption, first with concentrated $H_2SO_4$ to form oleum, and then with lean acid, i.e., sulfuric acid of less than 98% concentration, for polishing (i.e., for removal of residual $SO_3$). Concentrated acid is partly recycled to scrubber-dryer 14 via pipe 94 and returned (slightly diluted) via pipe 92 to tower and absorber 22. Highly diluted acid generated in scrubber 14 is discharged via pipe 96 carrying with it the water removed from the furnace gas and the secondary oxidation air, the $SO_3$ produced in the furnace 10, and ash from corrosion products. Fresh water for absorbing the convertor product $SO_3$ if needed to adjust acid/oleum ratio is added to the tower and absorber via line 98. Product sulfuric acid and/or oleum is removed through pipe 42 and stack gases are removed through pipe 44. The waste heat boiler 12 generates steam which exits through pipe 46 with a portion supplied to turbine 18 and excess steam, which can be used for other parts of the process or be exported, exits through pipe 48.

Improvement of Enriching Air Fed to the Furnace

Figure 2:
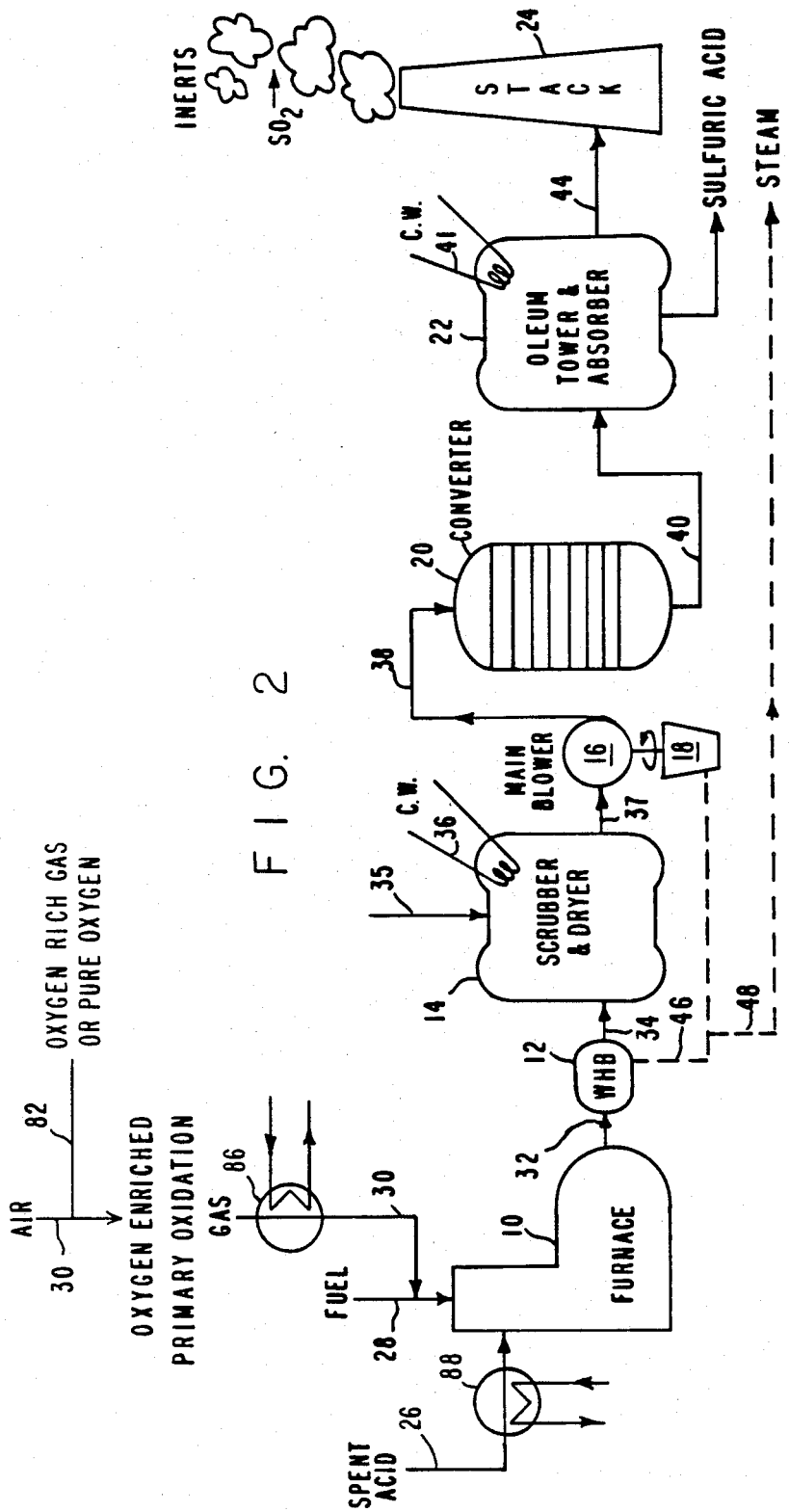
FIG. 2 is a diagramatic flow sheet of a SAR system which uses oxygen enrichment of the air fed to the furnace.

In this improved embodiment, shown in FIG. 2, oxygen-enriched air or pure oxygen is supplied through pipe 82 and mixed with ambient air being supplied through pipe 30 so that resulting oxygen-enriched air is employed as the primary oxidation gas supplied to the furnace. This improvement in the spent acid recovery process also reduces the amount of inert gases in the furnace.

The degree of enrichment has practical limitations. As the concentration of oxygen entering the furnace is increased the flame temperature increases, flame length shortens, and more sophisticated burners and more exotic refractories are needed to attain efficient combustion, long equipment life, and to minimize the potential for an explosion. Enriched air containing 22 to 40% oxygen can be used in conventional SAR furnaces with conventional materials and a reasonable amount of control instrumentation.

Improvement of Recycling Stack Gases

Figure 3:
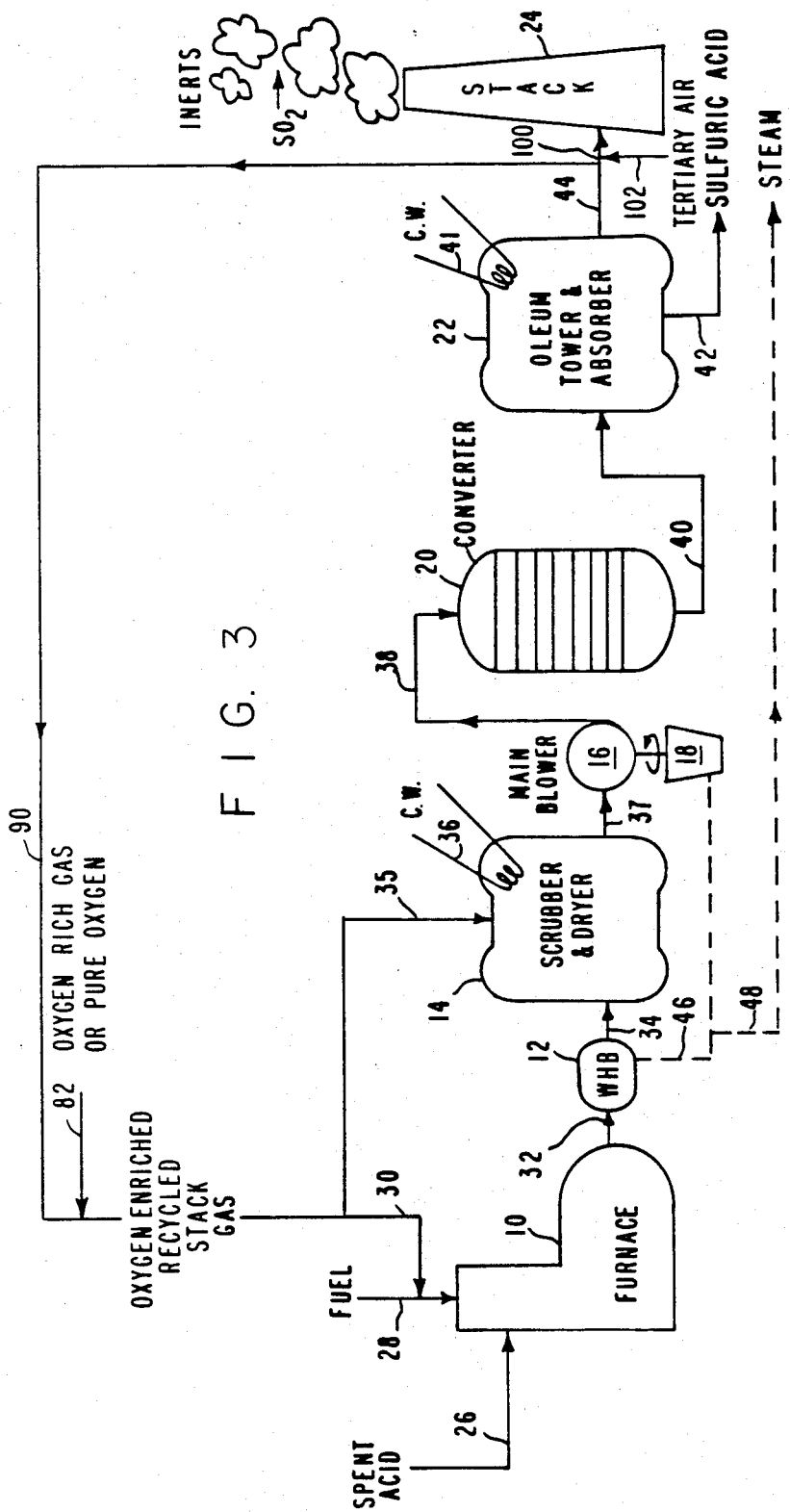
FIG. 3 is a diagramatic flow sheet of a SAR system incorporating the recycle of stack gases.

In another improvement, shown in FIG. 3, stack gas from line 44 is recycled through pipe 90 and mixed with oxygen-enriched air or pure oxygen being supplied through pipe 82, providing an oxygen-enriched recycled stack gas to the primary oxidation gas pipe 30 and to secondary oxidation gas pipe 35. The amount of stack gas (90) recycled depends on the concentration $O_2$ in the oxygen-enriched air and on the desired concentration of oxygen in the resulting oxidant gases entering the furnace.

In this improvement, 30 to 90% of the stack gas is mixed with oxygen or oxygen-enriched air, and the mixture is fed to the furnace and to the converter. Preferably the mixture will contain 22 to 40 volume % oxygen-enriched air and 60 to 78 volume % stack gas. As shown in FIG. 3, the recycled stack gas is supplied through pipe 90 and mixed with oxygen-enriched air being supplied through pipe 82 to form the oxygen-enriched recycled stack gas that is supplied through pipe 30 to the furnace and through pipe 35 to the scrubber and dryer 14.

This improvement provides substantial reduction in the amount of nitrogen introduced into the system. Thus, the reduction of pollution by vented $SO_2$ and $NO_x$ is particularly large because the system has been essentially closed to the limit permitted by the need to purge $CO_2$ and $N_2$. There are other benefits as well; the amount of moisture entering the system is reduced by eliminating that mixture which ordinarily enters with the air. It is also possible to recover most of the sensible heat and sulfur values lost otherwise in the stack gas, 44.

Improvement of Indirect Preheating Spent Acid and/or Air

Figure 4:
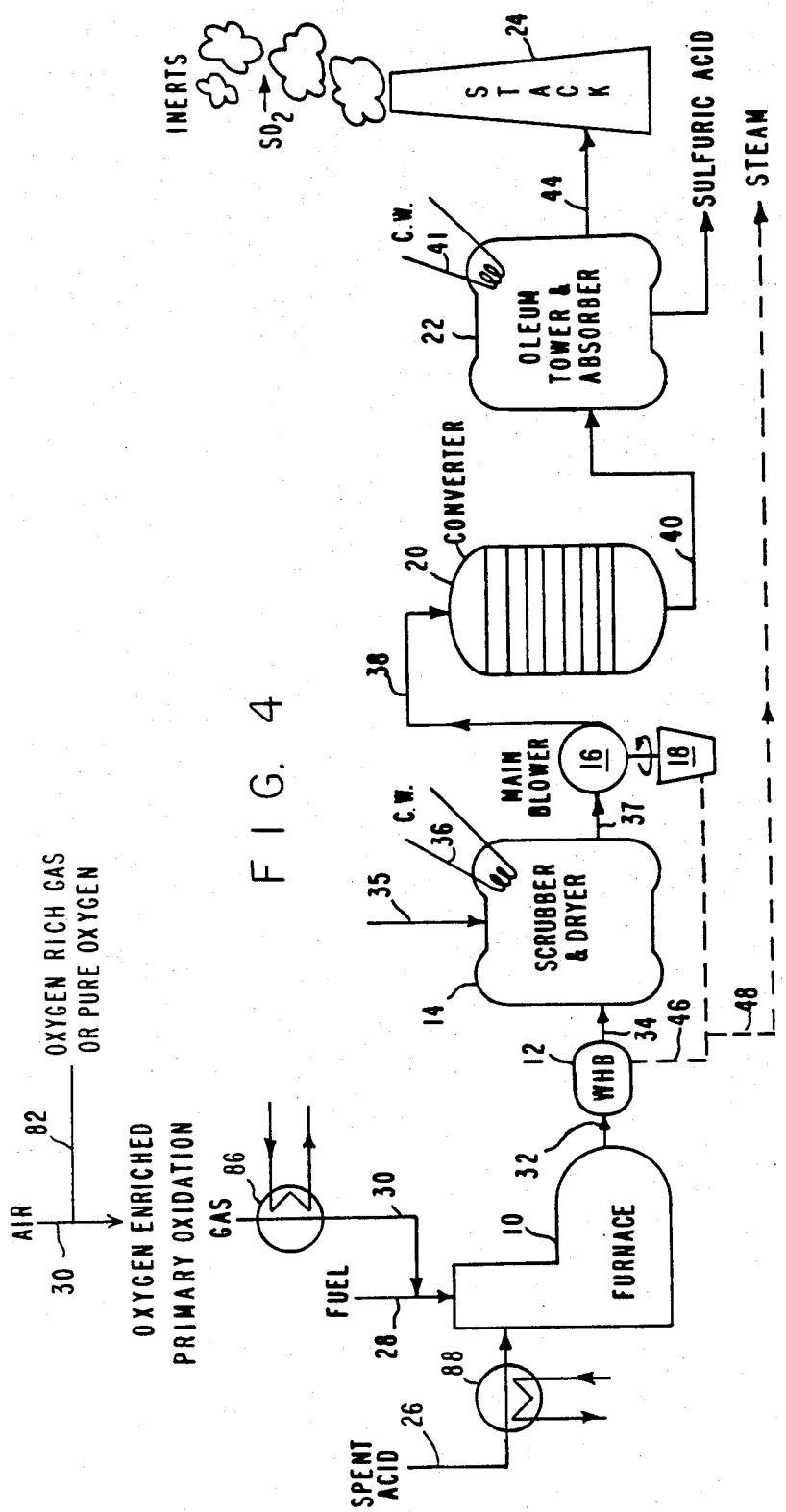
FIG. 4 is a diagramatic flow sheet of a SAR system incorporating preheating of the spent acid and enriched air being fed to the furnace.

In another improvement, shown in FIG. 4 oxygen-enriched combustion air being supplied through pipe 30 is preheated indirectly in preheater 86 to a temperature of between 600° and 1000° C. while spent acid being supplied through pipe 26 is indirectly preheated in preheater 88 to a temperature of between 100° and 200° C. This reduces the amount of energy needed for direct preheat by combustion in the furnace.

Examples

The following examples illustrate the improvement in furnace effectiveness and reduction in inerts passed through the systems.

In Examples 1–3, the numerical values obtained were obtained by simulating the process in a computer, and making parameter calculations from the simulation results.

Comparative Example A exemplifies use of a conventional SAR furnace (FIG. 1) with operating conditions and outputs as detailed in Table I.

Example 1 shows the improvement when the primary oxidation gas is oxygen-enriched air (total oxygen content is 36% by volume).

Example 2 shows the improvement when 90% of the stack gas is recycled.

Example 3 shows the improvement when the spent acid is preheated to 140° C.

TABLE I

|  | Examples | | | |
| --- | --- | --- | --- | --- |
|  | A | 1 | 2 | 3 |
| Temp. of Spent acid supplied to furnace, °C. | 80 | 80 | 80 | 140 |
| Temp. of primary oxidation gas supplied to furnace, °C. | 677 | 677 | 677 | 677 |
| % $O_2$ (by volume) in the primary oxidation gas (air) supplied to furnace | 21 | 36 | 36 | 24 |
| Stack gas recycled, % by volume | — | — | 90 | — |
| Concentration of $O_2$ in furnace exit gas (% by Volume, wet basis) | 2 | 1 | 1 | 1 |
| Furnace Temp., °C. | 1000 | 1000 | 1000 | 1000 |
| Composition of furnace gas exit (% by volume, dry basis) | | | | |
| $SO_2$ | 11.1 | 21.5 | 21.5 | 15.3 |
| $SO_3$ | 0.2 | 0.3 | 0.3 | 0.2 |
| $O_2$ | 3.1 | 2.5 | 2.5 | 3.1 |
| $N_2$ | 75.9 | 59.2 | 1.2 | 70.8 |
| $CO_2$ | 9.7 | 16.9 | 74.9 | 12.1 |
| Relative Ratio of $N_2$ to /$SO_x$ | 1.0 | 0.4 | 0.01 | 0.67 |
| Relative ratio of total inerts ($N_2 + CO_2$) in furnace exit-gas to unit of $H_2SO_4$ produced | 1.0 | 0.46 | 0.46 | 0.7 |
| Relative flow rate of gas leaving furnace | 1.0 | 0.66 | 0.66 | 0.70 |
| Relative fuel consumption | 1.0 | 0.65 | 0.59 | 0.81 |
| Relative load of $NO_x$ produced in furnace | 1.0 | 0.38 | 0.01 | 0.57 |

I claim:

1. In the process for producing oleum from a spend acid mixture of ammonium bisulfate and dilute sulfuric acid, and resulting from the preparation of methyl methacrylate, which process comprises pyrolyzing the mixture by feeding spent acid, fuel and air into a furnace to obtain gaseous oxide products including $SO_2$; oxidizing the $SO_2$ to $SO_3$ with oxygen; and absorbing the $SO_3$ in concentrated sulfuric acid to form oleum; the improvement comprising:
    indirectly heating the spent acid to a temperature of between 100° and 200° C. and separately indirectly heating the air to a temperature between 600° to 1000° C. prior to feeding the heated acid and air directly into the furnace.

2. A process of claim 1 wherein the improvement further comprises feeding into the furnace air that is enriched with oxygen so that the air contains between 22% and 40% oxygen by volume.

* * * * *